US012487998B1

(12) United States Patent
Goyal et al.

(10) Patent No.: US 12,487,998 B1
(45) Date of Patent: Dec. 2, 2025

(54) CONTEXTUAL GRAPH DYNAMICS FOR NATURAL LANGUAGE TO SQL CONVERSION

(71) Applicant: Dell Products L.P., Round Rock, TX (US)

(72) Inventors: Shweta Goyal, Bangalore (IN); Kailash Talreja, Mumbai (IN); Sailendu Kumar Patra, Bangalore (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/790,103

(22) Filed: Jul. 31, 2024

(51) Int. Cl.
*G06F 16/2452* (2019.01)
*G06F 16/21* (2019.01)
*G06F 40/58* (2020.01)

(52) U.S. Cl.
CPC ...... *G06F 16/24522* (2019.01); *G06F 16/212* (2019.01); *G06F 40/58* (2020.01)

(58) Field of Classification Search
CPC ... G06F 16/24522; G06F 16/212; G06F 40/58
See application file for complete search history.

(56) References Cited

U.S. PATENT DOCUMENTS

| 12,271,374 B1* | 4/2025 | Lai | G06F 16/242 |
| 2025/0061111 A1* | 2/2025 | Han | G06F 16/28 |

OTHER PUBLICATIONS

Gong, Graph Reasoning Enhanced Language Models for Text-to-SQL, pp. 2447-2452, Jul. 11, (Year: 2024).*
Bogin, Representing Schema Structure with Graph Neural Networks for Text-to-SQL Parsing, pp. 1-7, Jun. 3 (Year: 2019).*
Li, Graphix-T5: Mixing Pre-trained Transformers with Graph-Aware Layers for Text-to-SQL Parsing, pp. 13076-13084 (Year: 2023).*
Yu, Spider: A Large-Scale Human-Labeled Dataset for Complex and Cross-Domain Semantic Parsing and Text-to-SQL Task, pp. 1-11 (Year: 2019).*

* cited by examiner

*Primary Examiner* — Albert M Phillips, III
(74) *Attorney, Agent, or Firm* — Chamberlain, Hrdlicka, White, Williams & Aughtry; Aly Z. Dossa

(57) ABSTRACT

A method for training a model to generate a structured query language (SQL) output using a natural language input includes receiving a training data set that includes natural language queries, corresponding SQL statements, and a corresponding database. The method also includes extracting query-specific schema from the corresponding database. Further, the method includes embedding the natural language queries and the query-specific schema to generate initialized embeddings, where each initialized embedding corresponds to a natural language query of the natural language queries, and where the corresponding SQL statement is one of the corresponding SQL statements; generating subgraphs based on the initialized embeddings and the natural language queries; training a graph neural network (GNN) using the subgraphs as inputs; generating, using the GNN, refined outputs based on the subgraphs; and training a transformer model using the refined outputs and the natural language queries to obtain a trained model.

18 Claims, 6 Drawing Sheets

CONTEXTUAL GRAPH DYNAMICS FOR NATURAL LANGUAGE TO SQL CONVERSION

BACKGROUND

Large amounts of information are often stored in structured formats within databases and users may want to search through these databases to find particular sets of information. However, searching these databases may require structuring searches in a particular format with which many users may be unfamiliar. In addition, training users to utilize these particular formats may be time-consuming.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1:
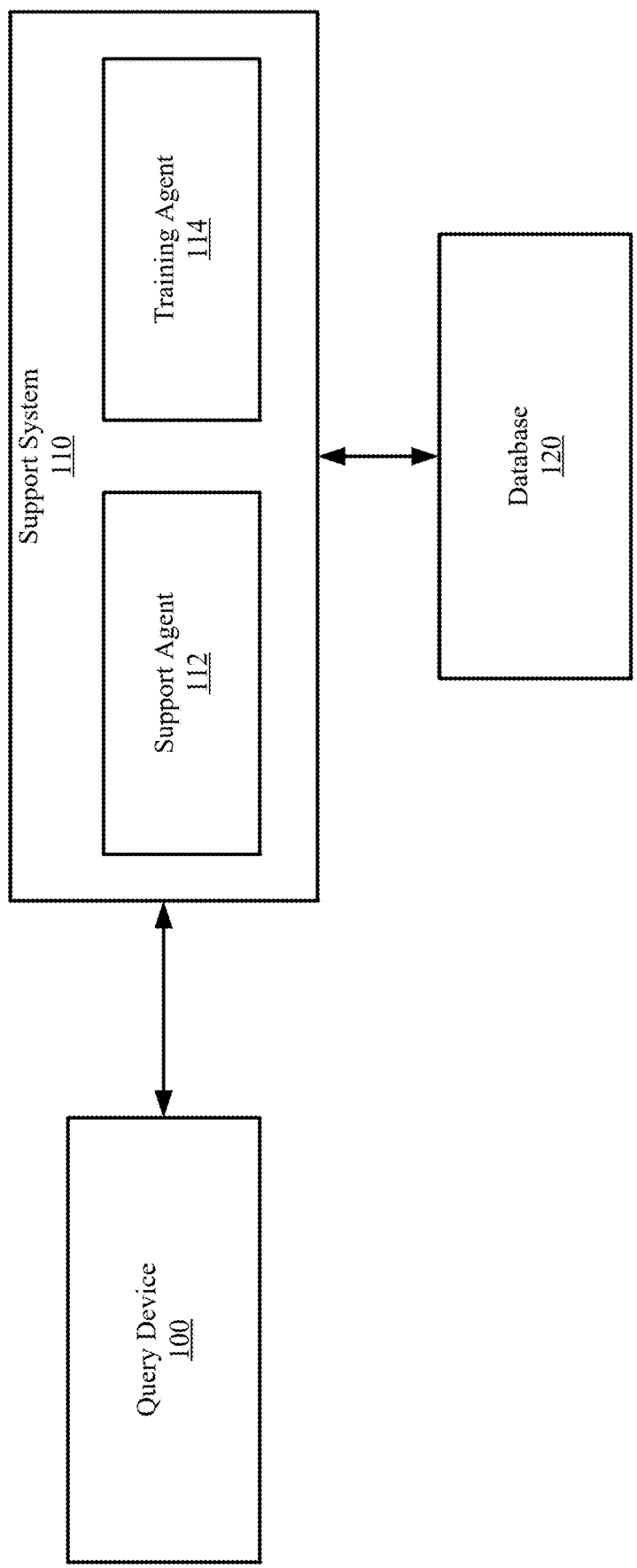
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

The rapid proliferation of relational databases has underscored the need for efficient searching through the databases. Typically searching databases involves the use of querying via the use of structured query language (SQL). However, learning how to query through SQL is a difficult, time-consuming task. As such, using natural language searches using a technique called text-to-SQL has emerged as a popular solution to this problem. However, implementing text-to-SQL has presented several challenges. Traditional Graph Neural Networks (GNNs), commonly employed for such tasks, often utilize static graph structures, limiting their adaptability to diverse and complex queries. Additionally, the depth of GNNs and their initialization strategies have been areas of concern, with deep GNNs facing an issue of over-smoothing and random initialization lacking the semantic richness required for nuanced parsing.

To address, at least in part, the aforementioned issues discussed above, embodiments disclosed herein relate to systems, methods, and/or non-transitory computer readable mediums that enable an approach that dynamically tailors the graph structure of the GNN based on the context of the input query. This ensures that the GNN remains focused on the most relevant parts of the database schema, enhancing both efficiency and accuracy. To imbue the system with deep semantic understanding, the GNN's node representations are modified further using pre-trained language models, bridging the performance gap left by traditional methods. The GNN layers introduced herein self-adjust based on the complexity of the input, ensuring optimal performance without succumbing to the pitfalls of over smoothing. In addition, a hybrid initialization strategy is introduced that combines the strengths of pre-trained language models with traditional initialization methods. This dual approach provides a GNN that starts with a rich semantic foundation while retaining the flexibility to adapt to the specific text-to-SQL task at hand.

The following describes one or more embodiments.

FIG. 1 shows a system in accordance with one or more embodiments. The system may include a query device (100) a support system (110), and a database (120). Each of these system components is described below.

In one or more embodiments, the query device (100), the support system (110), and/or the database (120) may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the query device (100), the support system (110), and the database (120). Moreover, the query device (100), the support system (110), and the database (120) may communicate with one another using any combination of wired and/or wireless communication protocols.

In one or more embodiments, the query device (100) may represent any physical computing system whereby one or more users may pose queries (also referred to herein as user inputs) and, subsequently, may receive resources (or information) best fit to address the queries. To that extent, the query device (100) may include functionality to: capture user inputs from users through speech and/or text; delegate the user inputs to the support system (110) for processing; receive resources (i.e., information through one or more forms or formats—e.g., text, images, speech, etc.) from the support system (110), which may address the user inputs and provide the received resources to the users. One of ordinary skill will appreciate that the query device (100) may perform other functionalities without departing from the scope of the disclosure. Examples of the query device (100) may include, but are not limited to, a desktop computer, a laptop computer, a tablet computer, a smartphone, a smart speaker, any other computing system similar to the exemplary computing system shown in FIG. 6, a telephone, or any other device capable of facilitating communication between a user and the support system (110).

While FIG. 1 shows a configuration of components, other system configurations may be used without departing from the scope of the disclosure. For example, in one embodiment, more than one query device (not shown) may operatively connect to the support system (110).

In one or more embodiments, the support system (110) includes a support agent (112) that includes functionality to receive user inputs and provide responses to the user inputs via the query device (100) and a training agent (114) that includes functionality to prepare, train, and finalize models that are used by the support agent (112). With this functionality, the user may provide to the support system (110) (e.g., via the query device (100)) a natural language query that the support system (110) can translate to a database query, such as a SQL query, perform a search of a database (e.g., database (120)) using the database query, and then provide the results of the query to the user (e.g., via the query device (100)). To do so, the support agent (112) may represent a machine learning processing platform described in greater detail below.

In one or more embodiments, the support system (110) is implemented using one or more computing devices (not shown), which may include computing servers. Each server may represent a physical server that may reside in a datacenter, or a virtual server that may reside in a cloud computing environment. Additionally or alternatively, the support system (110) may be implemented using one or more computing systems similar to the exemplary computing system shown in FIG. 6.

In one or more embodiments, the database (120) is used to store data that is used by the support system (110). In one or more embodiments, the database (120) is the target database that a user wishes to search. In one or more embodiments, the database (120) stores data used by the training agent (114) to perform actions in the building of a model, such as training, validating, calibrating, etc.

In one or more embodiments, the database (120) is implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The database (120) may be implemented using other types of computing devices without departing from the embodiments disclosed herein. For additional details regarding computing devices, refer to FIG. 6. Further, in one or more embodiments, the database (120) is located on any combination of the query device (100), the support system (110), and any other location.

In one or more embodiments, the support system (110) and/or the database (120) are implemented using logical devices without departing from the embodiments disclosed herein. For example, the support system (110) and/or the database (120) may include virtual machines that utilize computing resources of any number of physical computing devices to provide the functionality of the support system (110) and/or the database (120). The support system (110) and/or the database (120) may be implemented using other types of logical devices without departing from the embodiments disclosed herein.

Figure 2:
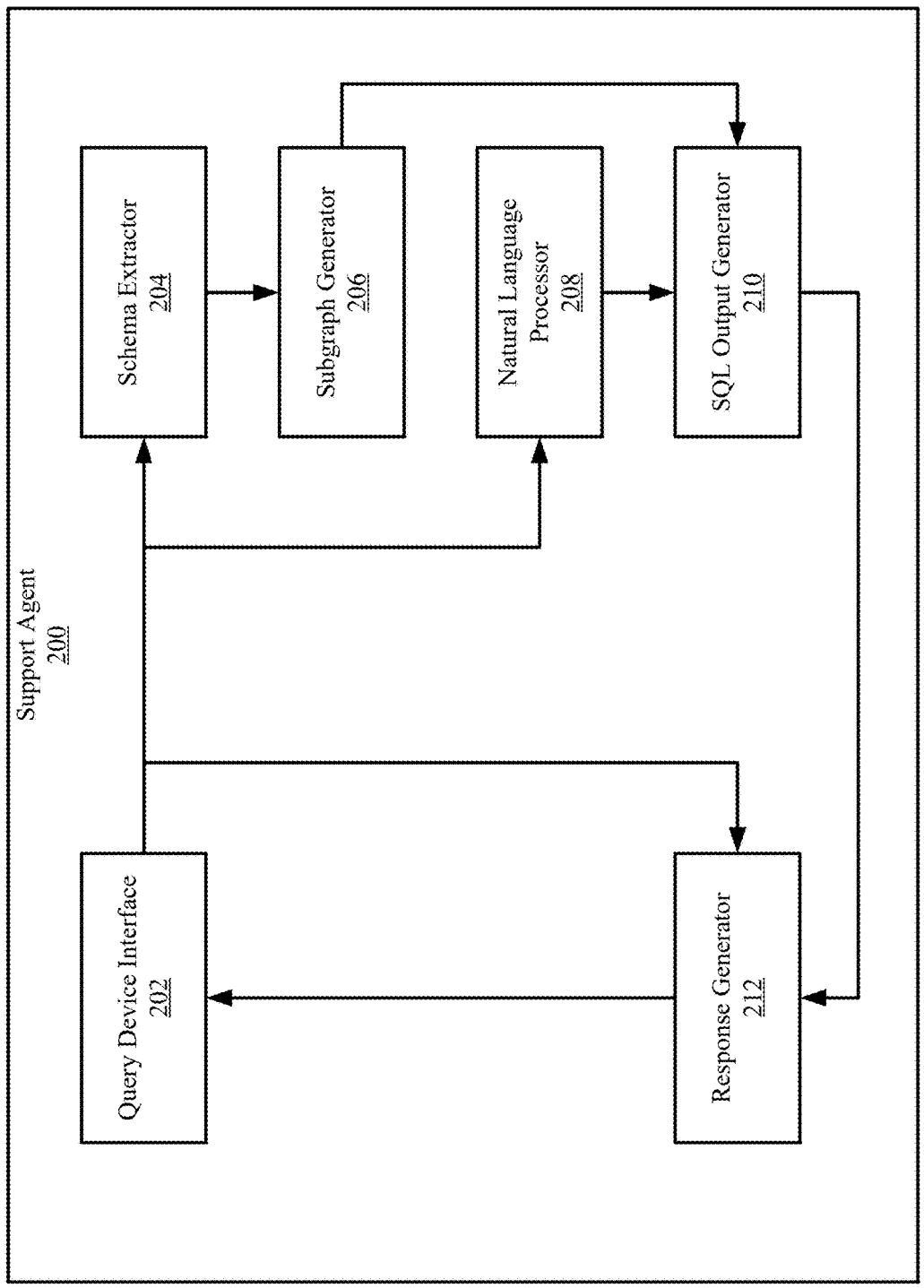
FIG. 2 shows a diagram of a support agent in accordance with one or more embodiments.

FIG. 2 shows a support agent (200) (i.e., the support agent (112) in FIG. 1) in accordance with one or more embodiments. The support agent (200) includes a query device interface (202), a schema extractor (204), a subgraph generator (206), a natural language processor (208), a SQL output generator (210), and a response generator (212). Each of these system components is described below.

Figure 6:
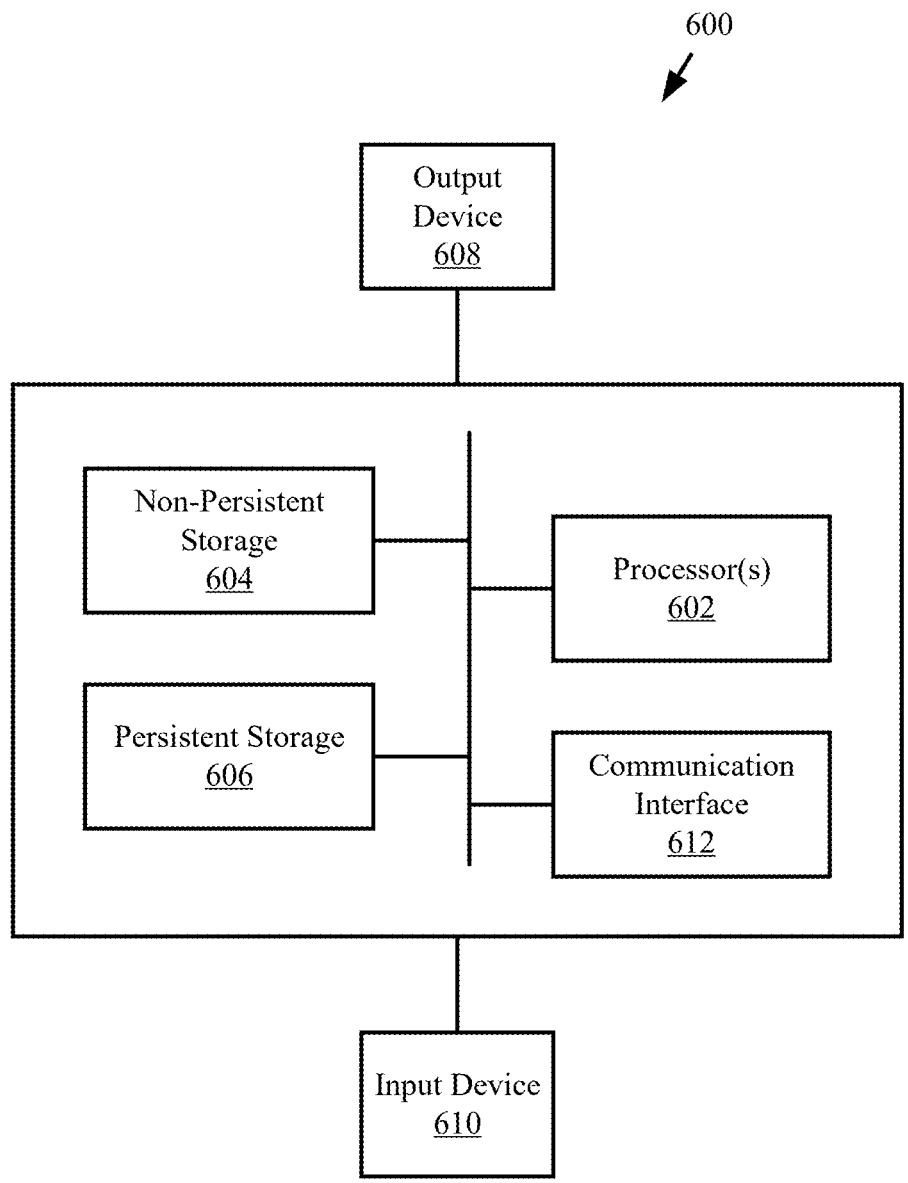
FIG. 6 shows a computing system in accordance with one or more embodiments.

In one or more embodiments, one or more of the query device interface (202), the schema extractor (204), the subgraph generator (206), the natural language processor (208), the SQL output generator (210), and the response generator (212) are implemented as a computing device (see e.g., FIG. 6). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the associated component described throughout this application and/or all, or a portion thereof, of the method illustrated in FIG. 4.

In one or more embodiments, one or more of the query device interface (202), the schema extractor (204), the subgraph generator (206), the natural language processor (208), the SQL output generator (210), and the response generator (212) are implemented as a logical device. The logical device may utilize the computing resources of the support agent (200) and thereby provide the functionality of the associated component described throughout this application and/or all, or a portion thereof, of the method illustrated in FIG. 4.

In one or more embodiments, the query device interface (202) may be designed and configured to facilitate communications between the support agent (200) and any query device (not shown) (see e.g., FIG. 1). To that extent, the query device interface (202) may include functionality to: receive user inputs (e.g., audio or textual information) from a query device; perform preliminary processing to convert the user inputs into a machine-readable format (described below); provide the user inputs to the other components of the support agent (200); receive responses, which may or may not address the user inputs, from the response generator (212); provide the responses to the query device; receive feedback (i.e., additional user inputs reflecting whether the responses properly addressed the user inputs) from the query device; and repeat all of the above to form a conversation with a user.

In one or more embodiments, the query device interface (202) may be designed and configured to convert user inputs, if received in any spoken language or audio data format, into a textual data format. To that extent, the query device interface (202) may include functionality to: transcribe audio-formatted user inputs into text-formatted user inputs using any existing speech recognition or speech-to-text algorithm; and provide the text-format input queries to the other components of the support agent (200) for processing. If the input queries are already textually formatted when received, then the query device interface (202) may include further functionality to circumvent the data format conversion process and, subsequently, provide the other components of the support agent (200) with the received user inputs. One of ordinary skill will appreciate that the query device interface (202) may perform other functionalities without departing from the scope of the disclosure.

In one or more embodiments, the schema extractor (204) is designed and configured to receive the user inputs from the query device interface (202) and identify the relevant schema from the database being searched. For example, a user may provide a natural language query. The schema extractor (204) includes functionality to identify the database being queried and extract the schema from the identified database that is relevant to the natural language query. In one or more embodiments, the schema extractor (204) performs this functionality by mapping the user input (e.g., the natural language query) to a mapping table associated with the relevant database. Then, based on this mapping of relevant tables, columns, and relationships are fetched from the database and converted into a text format, such as JSON. In one or more embodiments, if the schema extractor (204) is setup to work with the specific database being queried, then the schema extractor (204) may utilize predefined commands and/or application programming interface (API) calls to retrieve the relevant schema from the specific database. In one or more embodiments, the schema extractor (204) also includes functionality to provide the relevant schema to the subgraph generator (206).

In one or more embodiments, the subgraph generator (206) is designed and configured to receive the relevant schema from the schema extractor (204). In one or more embodiments, the subgraph generator (206) includes functionality to receive the relevant schema and convert the relevant schema into embeddings and then into a subgraph. In one or more embodiments, the subgraph generator (206) includes functionality to dynamically enhance the subgraph by integrating context from the natural language query and/or fuse embeddings from multiple sources, such as pre-trained word embeddings, database schema metadata, and query context using a graph diffusion method. The functionality of the subgraph generator (206) is described in further detail below in reference to FIG. 4.

In one or more embodiments, the natural language processor (208) may be designed and configured to receive the user inputs from the query device interface (202) and convert the natural language query into embeddings. In one or more embodiments, the natural language processor (208) utilizes natural language processing techniques that may be further refined via training using datasets such as databases, natural language to SQL queries, etc. In one or more embodiments, the natural language processor (208) is integrated into the query device interface (202) to enable the schema extractor (204) and/or the subgraph generator (206) to utilize the embeddings from the natural language query.

In one or more embodiments, the SQL output generator (210) may be designed and configured to receive the subgraph provided by the subgraph generator (206) and the natural language query to generate a SQL query. In addition, the SQL output generator (210) may include functionality to perform an action from an action set using the generated SQL query, such as executing the SQL query on the target database and presenting a results list to the user, executing the SQL query on the target database and manipulating the database based on the user input. In one or more embodiments, the SQL output generator (210) includes a combination of a GNN and a transformer model.

In one or more embodiments, the GNN portion of the SQL output generator (210) includes functionality to: identify nodes and edges of the subgraph; aggregate, for each node of the subgraph, information from its neighboring nodes and edges (e.g., via functions such as sum, mean, or max); identify the complexity of the query; and dynamically adjust the depth of the GNN based on the complexity. In one or more embodiments, the output of the GNN portion is a set of enriched embeddings that capture the contextual information of the database schema and the natural language query.

In one or more embodiments, the transformer model portion of the SQL output generator (210) includes functionality to receive the output of the GNN portion and generate a SQL query. In one or more embodiments, the transformer model is an encoder-decoder model that includes encoding, decoding, attention mechanisms, and optimization techniques.

In one or more embodiments, the response generator (212) is designed and configured to receive the user inputs from the query device interface (202) and the action and/or the SQL query provided by the SQL output generator (210) and generate a response that is in a plain language for a user. To provide this functionality, the response generator (212) may utilize machine learning and natural language processing techniques to determine and provide the action. For example, the response generator (212) may utilize a transformer model trained on a large conversational dataset to provide a natural language response to the user that also captures the action and/or the SQL query provided by the SQL output generator (210). The response generator (212) then provides the response to the query device interface (202) which can present the response to the user.

Figure 3:
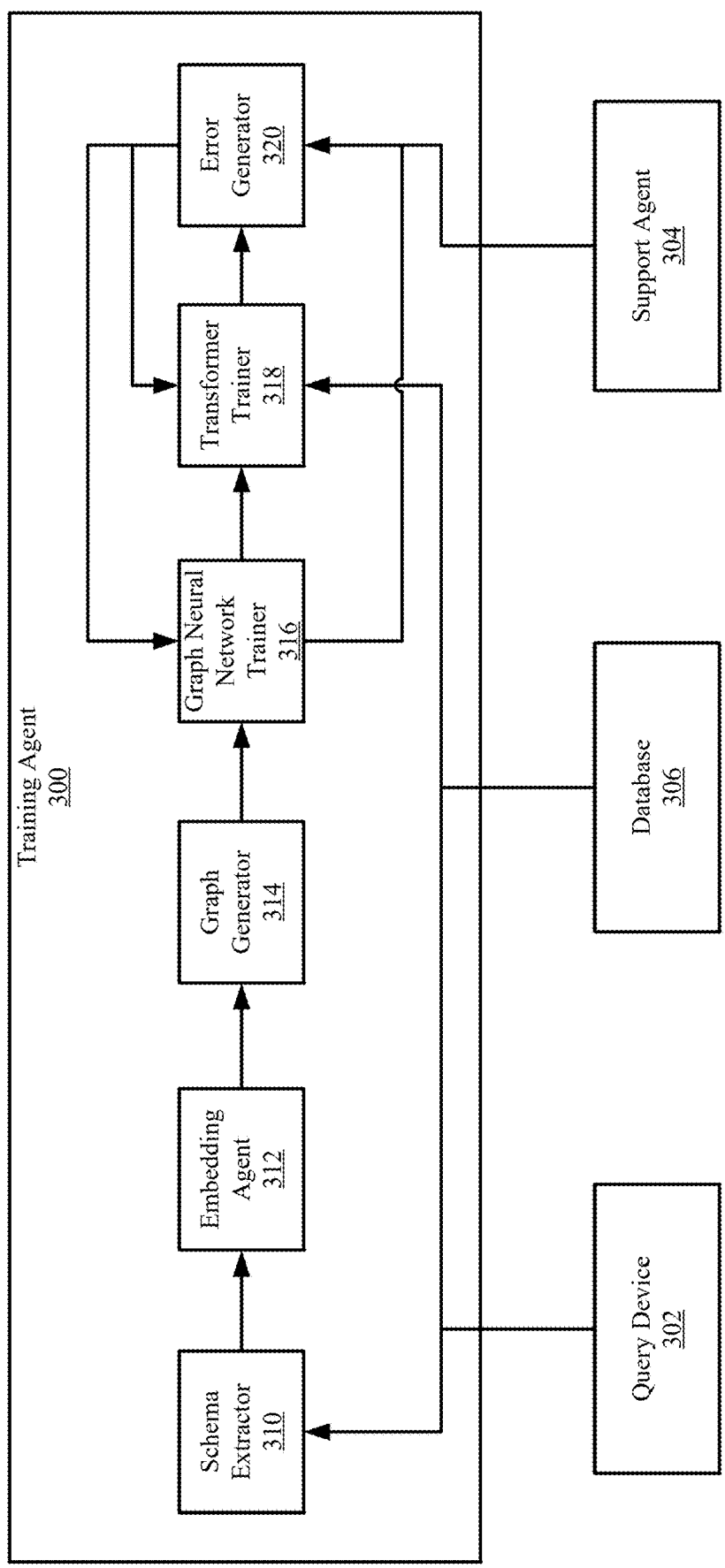
FIG. 3 shows a diagram of a training agent in accordance with one or more embodiments.

Turning to FIG. 3, FIG. 3 shows a training agent (300) (i.e., the training agent (114) of FIG. 1), a query device interface (302) (i.e., the query device (100) of FIG. 1), a database (306) (i.e., the database (130) of FIG. 1), and a support agent (304) (i.e., the support agent (200) of FIG. 2) in accordance with one or more embodiments. The training agent (300) includes a schema extractor (310), an embedding agent (312), a graph generator (314), a GNN trainer (316), a transformer trainer (318), and an error generator (320).

In one or more embodiments, one or more of the schema extractor (310), the embedding agent (312), the graph generator (314), the GNN trainer (316), the transformer trainer (318), and the error generator (320) are implemented as a computing device (see e.g., FIG. 6). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the associated component described throughout this application and/or all, or a portion thereof, of the method illustrated in FIG. 5.

In one or more embodiments, one or more of the schema extractor (310), the embedding agent (312), the graph generator (314), the GNN trainer (316), the transformer trainer (318), and the error generator (320) are implemented as a logical device. The logical device may utilize the computing resources of the training agent (300) and thereby provide the functionality of the associated component described throughout this application and/or all, or a portion thereof, of the method illustrated in FIG. 5.

In one or more embodiments, the schema extractor (310) includes functionality to receive training data (e.g., from the query device (302) and/or the database (306)) and extract schema information from both natural language queries, SQL equivalents, and/or databases being searched. In one or more embodiments, the natural language queries are sourced from real-world interactions with the databases and additional queries may be generated by simulating training data based on the real-world interactions. Further, the natural language queries may include a wide range of intents, complexities, and structures.

In one or more embodiments, the extraction of database schema provides a blueprint of how the data is organized and how relationships between data are handled within the database. In one or more embodiments, the database schema includes details about tables, columns, data types, primary keys, foreign keys, constraints, and/or relationships. In one or more embodiments, the tables are structures that hold data and each table may include a unique name, columns, and rows. In one or more embodiments, the columns, also known as fields, define the type of data stored in a table and may include a specific data type and name. In one or more embodiments, the primary key is a unique identifier for a record in a table. In one or more embodiments, the foreign key is a set of one or more columns in a table that refers to the primary key in another table, thereby establishing a relationship between the two tables. In one or more embodiments, the constraints are rules that define the type of date, range of value, etc. for a particular column. In one or more embodiments, relationships define how tables connect and interact with each other, such as one-to-one, one-to-many, or many-to-many relationships.

In one or more embodiments, in order to collect the database schema, a connection to the database is established using appropriate credentials and connection strings and then database-specific commands or queries are used to retrieve the schema. For example, in SQL-based databases, commands like describe table name or querying the information_schema can provide schema details. In one or more embodiments, the retrieved schema information is processed to extract table names, column names, data types, keys, constraints, and relationships and then the parsed schema is converted into a structured JSON format that can be easily used by other components of the training agent (300).

In one or more embodiments, the schema extractor (310) also include functionality to extract query-specific schema from the natural language query. In one or more embodiments, the generation of the query-specific schema includes: query analysis, schema keyword mapping, relevance determination, relationship exploring, and schema retrieval. In one or more embodiments, query analysis includes extracting keywords, entities, and potential intents from the natural language query, using, for example, natural language processing techniques. In one or more embodiments, schema keyword mapping includes mapping keywords or terms to tables and columns, which may be performed manually or via algorithms. In one or more embodiments, the relevance determination includes using the extracted keywords and the schema mapping to identify the tables and columns most likely relevant to the natural language query. In one or more embodiments, the relationship exploration includes exploring relationships between the identified tables and related tables to ensure retrieval of all identified and related tables. In one or more embodiments, schema retrieval includes retrieving schema information from only the identified tables and related tables, which may include table structures, column data types, relationships, constraints, and any other metadata.

In one or more embodiments, the datasets produced above may be enhanced. For example, synthetic datasets may be generated using the datasets produces above which can include any of the following steps: modifying queries, combining elements from different queries to generate new queries, introducing variations and/or noise to existing queries, adding typos to queries, adjust phrasing of queries, etc. The produced datasets and simulated datasets may be combined to form a finalized dataset. Further, in one or more embodiments, one or more of the datasets may be split into a training dataset, a validation dataset, a calibration dataset, and/or a testing dataset.

In one or more embodiments, the embedding agent (312) includes functionality to generate embeddings based on the natural language queries and the database schema. In one or more embodiments, embeddings are dense vector representations that capture the semantic essence of words, phrases, or other entities. In one or more embodiments, natural language query embedding includes using pre-trained natural language processing models (e.g., BERT) that have already been trained on vast amounts of text data and are capable of generating embeddings that capture the semantic meanings of words and phrases. In one or more embodiments, the pre-trained model are further trained using text-to-SQL data to further refine the embedding to the specific task of natural language query to SQL query.

In one or more embodiments, the embedding of the database schema includes the following steps: tokenization, pre-trained embeddings, schema-specific adjustments, relationship encoding, aggregation, normalization, and generating a schema embedding matrix. In one or more embodiments, tokenization includes tokenizing each element of the data base schema into a discrete unit. In one or more embodiments, pre-trained embeddings includes using a pre-trained model to convert the tokens into initial vector representations. In one or more embodiments, schema-specific adjustments includes adjusting the initial vector representations based on the specific structures and relationships of the tables (e.g., using a Word2Vec model). In one or more embodiments, relationship encoding includes encoding the relationships into the adjusted initial vector relationships (e.g., using a Word2Vec model). In one or more embodiments, aggregation includes aggregating the tokens to form embeddings for higher-level constructs. In one or more embodiments, the normalization includes normalizing all of the embeddings onto a consistent scale, such as a magnitude of 1. In one or more embodiments, generating the schema embedding matrix includes organizing all of the embeddings into a matrix. For example, each row of the matrix may represent the embeddings for a specific element, such as table, column, etc., of the schema. As discussed above, the embeddings capture the semantic meaning of schema elements, allowing the model to understand similarities and differences between various tables and columns. It also provides a dense, fixed-size representation for schema elements, making them suitable for neural network processing.

In one or more embodiments, the graph generator (314) includes functionality to receive the embeddings, such as the schema embedding matrix and generate a subgraph that a GNN is able to use as an input. In one or more embodiments, generation of the subgraph includes the following steps: base graph construction, dynamic node and edge creation, and graph pruning and refinement. In one or more embodiments, constructing the base graph includes forming nodes for each element included in the embeddings (i.e., each row of the schema embedding matrix). For example, the elements can include tokens from the natural language query, column names, table names, etc.

In one or more embodiments, dynamic node and edge creation includes adding edges based on relationships between the node and potential associations between the nodes based on the natural language query. In one or more embodiments, for each token from the natural language query, its embedding is compared with the embeddings of schema elements (tables, columns) to measure semantic similarity, which may be accomplished using cosine similarity. For example, if the token "red" has a high similarity score with the Color column's embedding, it suggests a potential association. In one or more embodiments, the database schema itself also provides information about relationships, such as foreign key constraints, which are also used to create edges. For example, if there is a foreign key relationship between productID in an orders table and productID in a products table, an edge can be created between them, even if the query does not explicitly mention this relationship. In one or more embodiments, the structure and phrasing of the natural language query also provides contextual information for edge creation. For example, proximity between tokens in the query might suggest potential associations. For example, in a query "orders of red shoes", the proximity of "orders" and "shoes" might suggest an association between the Orders table and a ProductName or Description column in the Products table. Based on the above, this approach allows for the dynamic addition of nodes and edges based on the query. The graph is dynamically augmented based on the context of each query, ensuring that the GNN focuses on relevant parts of the schema. Further, nodes and edges directly related to the query may be given higher scores.

In one or more embodiments, graph pruning and refinement includes pruning are reducing the weighting of nodes and edges that are not relevant to the current natural language query. In one or more embodiments, this pruning and refining is considered extracting the subgraph and may be based on similarity scores and thresholds. For example, portions of the graph below a first threshold similarity score may be removed from the graph and portions of the graph below a second threshold, which is higher than the first threshold, are down-weighted to obtain the subgraph. In one or more embodiments, obtaining the subgraph allows the subgraph to adapt to different queries and enhance the accuracy of the output of the training agent (300).

In one or more embodiments, the GNN trainer (316) includes functionality to receive the subgraph and generate refined embeddings for each node in the subgraph. In one or more embodiments, these refined embeddings capture both the inherent semantics of the schema elements and the context provided by the query, thereby providing a rich, context-aware representation of the schema and the query. In one or more embodiments, GNNs are designed to process graph-structured data and capture the relationships and structures within the graph. In one or more embodiments, the GNN trainer (316) includes functionality to initialize node and edge features, parse contextual messages using graph diffusion, and provide depth-adaptive processing.

In one or more embodiments, initializing node features includes starting, for each node in the graph (representing tables or columns), with an initial feature vector, typically the embedding derived from the schema and the query context. Each node, which may include a table or token in natural language processing, is initialized with an embedding that captures its semantic meaning, which may be derived from its name and attributes. In one or more embodiments, initializing edge features includes initializing based on the nature of the relationship included within or derived from node features. Edges, which may be thought of as relationships, are also embedded, capturing the nature of the relationship (e.g., one-to-many, many-to-many).

In one or more embodiments, parsing contextual messages using graph diffusion includes graph propagation. In one or more embodiments, graph propagation includes aggregating for each node, information from its neighboring nodes and edge, which may include using functions like sum, mean, or max. Further, when aggregating information from neighboring nodes, the current query's context is also considered to enable a sharper focus on relevant parts of the schema. In one or more embodiments, graph propagation includes updating the features of the node based on the aggregated features and its own current features, which may involve a combination of the aggregated features and the node's current features, then passed through a non-linear activation function. In one or more embodiments, the two above steps are repeated for a set number of iterations or until the node feature converge, such as by identifying the changes between consecutive iterations being below a threshold value. In one or more embodiments, the activation function includes non-linear activation functions, such as ReLu or Sigmoid, to introduce non-linearity into the feature vectors.

In one or more embodiments, provide depth-adaptive processing includes adjusting the depth of the GNN (i.e., the number of layer or iterations it processes the graph) based on the subgraph and/or query. For example, a simply query or subgraph may have less depth when compared to a more complex query or subgraph. In one or more embodiments, from the subgraphs, a number of nodes is determined. Based on the number of nodes, the natural language query is classified as low, medium or high complexity. For example, if the number of nodes is between 2 and 5 for a given input, then the complexity is low, if the number of nodes is between 6 and 10, then the complexity is medium, and if the number of nodes is greater than 10, then the complexity is high.

In one or more embodiments, during training the GNN, based on the complexity of the inputs, the number of layers is decided dynamically, which helps in reducing the model training time because low complexity inputs that utilize a GNN with lower depth reduces the amount of training time when compared to GNN's that used a fixed depth which may be adapted to more complex data. Further, this dynamic adjustment of number of layers during model training helps in capturing the underlying relationships between natural language queries and database schema for all complexity of natural language queries.

In one or more embodiments, the transformer trainer (318) includes functionality to train a transformer model by receiving natural language queries from the training data and the enriched embeddings from the GNN trainer (316), and comparing the generated SQL query to the ground truth SQL query to refine the transformer model. In one or more embodiments, the transformer trainer (318) trains a transformer model, such as an encode-decoder model, that utilizes sequential data. In one or more embodiments, the transformer trainer (318) encodes the natural language query and the enriched embeddings from the GNN to generate a context vector, which is then used by the decoder to sequentially build a SQL query.

In one or more embodiments, the transformer trainer (318) utilizes a method called teacher forcing to increase the rate at which the transformer model converges. In one or more embodiments, teach forcing includes using the ground truth (i.e., the actual SQL query in the training data) as inputs to the decoder portion instead of the model's own previous predictions. In one or more embodiments, to prevent overfitting, dropout layers are introduces, which randomly sets a fraction of inputs to zero during training. In one or more embodiments, to prevent exploding gradients, gradients are clipped to a maximum value.

In one or more embodiments, the error generator (320) includes functionality to apply regularization techniques, over-smoothing techniques, and/or loss functions to the GNN and/or the transformer model. Further, in one or more embodiments, the error generator (320), may receive feedback from users over time (e.g., via the query device (302)) to refine the GNN and/or the transformer model via re-training. In one or more embodiments, the regularization techniques include dropout, which includes randomly setting a fraction of inputs to zero at each update during training to prevent any single node or edge from dominating the learning process, L2 regularization, which includes adding a penalty to the loss function based on the magnitude of weights, which discourages the model from assigning too much importance to any one weight, and/or early stopping, which includes stopping the training once the model's performance on a validation set stops improving, thereby preventing overfitting and over-smoothing from excessive training epochs. In one or more embodiments, the over-smoothing techniques include Jacobian regularization, which preserves the local graph by ensuring that the Jacobian matrix remains full rank, residual connection, which includes introducing skips or residual connections between layers in a GNN, and/or adaptive aggregation, which includes adjusting the weights of nodes based on the relevance to the natural language query. In one or more embodiments, the loss function includes measuring the difference between the predicted or generated SQL query and the ground-truth SQL query and adjusting the model's weights through backpropagation. In one or more embodiments, the loss function includes a cross-entropy loss which includes periodically measuring the model's performance using a validation data set and adjusting the values of hyper parameters based on the model's performance.

Figure 4:
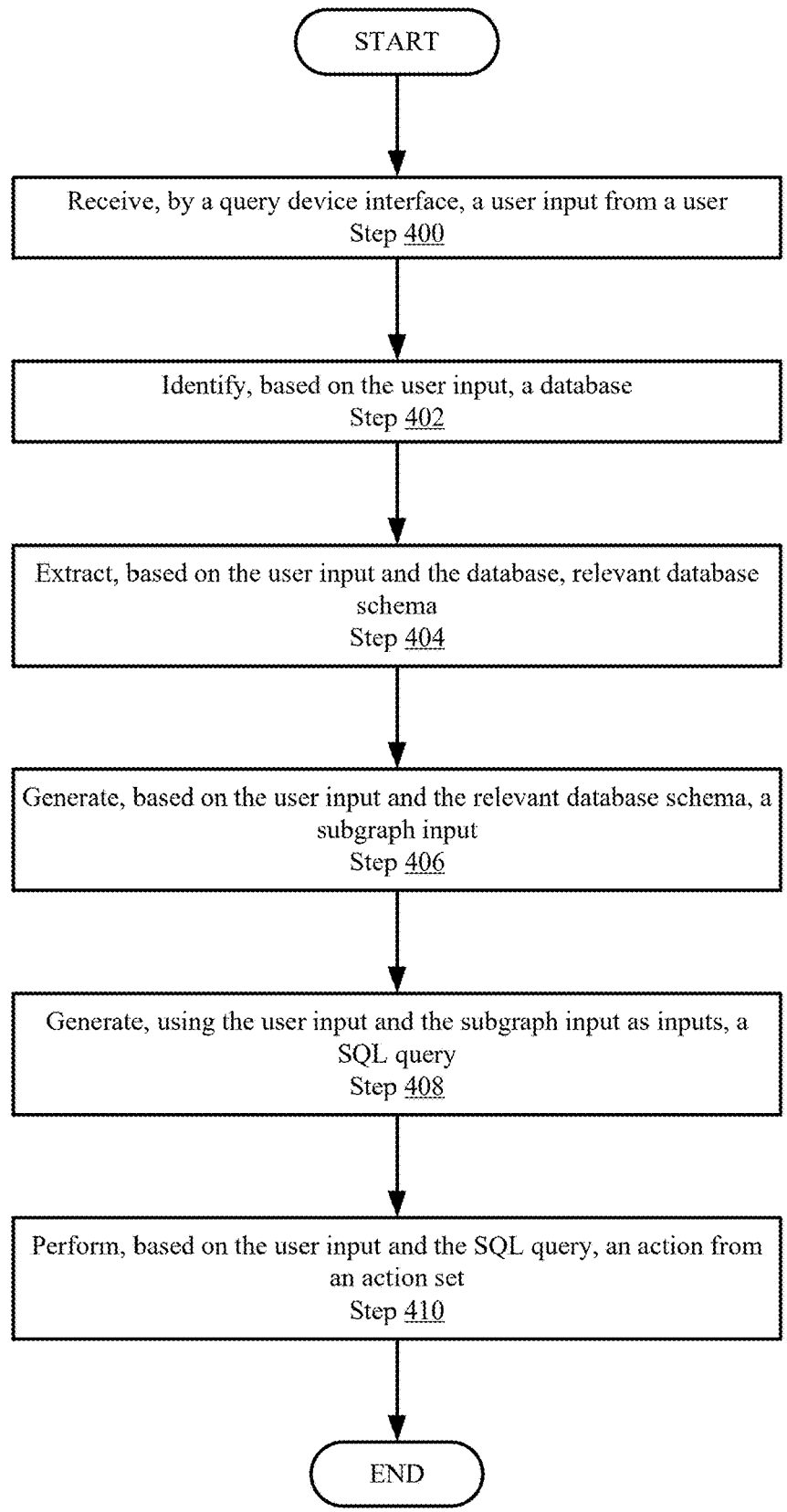
FIG. 4 shows a flowchart of a method for automatically generating and performing a query based on a user input in accordance with one or more embodiments.

Turning to FIG. 4, FIG. 4 shows a flowchart describing a method for automatically generating SQL queries based on user inputs in accordance with one or more embodiments disclosed herein. The method may be performed by, for example, the support agent (e.g., 200, FIG. 2).

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 400, a query device interface (e.g., the query device interface (202) in FIG. 2) receives a user input from a user via a query device (e.g., the query device (100) in FIG. 1). The user input may include any type of user input that conveys a request to search a database, including text input, voice input, menu selection, and/or image input. In one or more embodiments, as described above, the query device interface converts the user input into a machine-readable format, which may be accomplished via natural language processing.

In Step 402, the support agent identifies a database based on the user input. In one or more embodiments, the database is selected by the user. In one or more embodiments, the database includes multiple databases.

In Step 404, the support agent extracts the relevant database schema from the identified database based on the user input and the identified database. Further, in one or more embodiments, the user input may also be embedded as part of the extraction process. This extraction may be performed by the schema extractor (e.g., 204, FIG. 2), the details of which are discussed above.

In Step 406, the support agent generates a subgraph based on the user input and the extracted relevant database schema. The generation of the subgraph may be performed by the subgraph generator (e.g., 206, FIG. 2), the details of which are discussed above.

In Step 408, the support agent generates a SQL query using the user input and the subgraph input as inputs into a model. In one or more embodiments, the model includes the combination of the GNN and the transformer model, the relationship and functionality of which are discussed above.

In Step 410, the support agent performs an action from an action set based on the user input and the SQL query. In one or more embodiments, the action set includes presenting the SQL query to the user, executing the SQL query on the target database and presenting a results list to the user, executing the SQL query on the target database and manipulating the database based on the user input.

In one or more embodiments, the method may end following Step 410.

Figure 5:
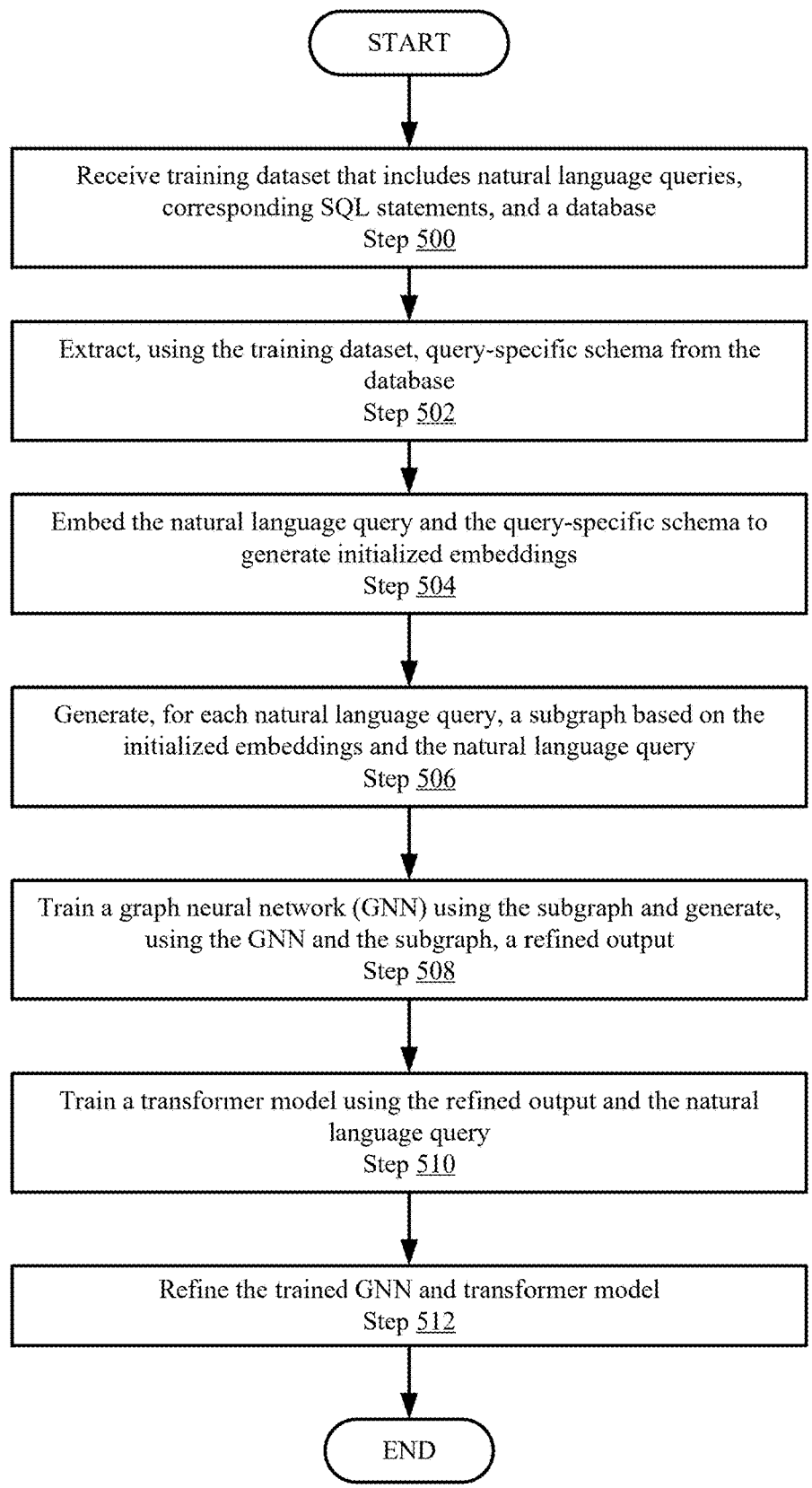
FIG. 5 shows a flowchart for generating a trained model capable of generating and performing a query based on a user input in accordance with one or more embodiments.

Turning to FIG. 5, FIG. 5 shows a flowchart describing a method for training a system to generate SQL queries based on natural language inputs in accordance with one or more embodiments disclosed herein. The method may be performed by, for example, the training agent (e.g., 300, FIG. 3).

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 500, the training agent receives a training dataset that includes natural language queries, corresponding SQL statements, and an associated database. In one or more embodiments, the training dataset is part of a larger dataset that was split into multiple parts that may also include a validation dataset, a calibration dataset, and a testing dataset.

In Step 502, the training agent extracts query-specific schema from the database using the training dataset. In one or more embodiments, this extraction is performed by a schema extractor (e.g., 310, FIG. 3), the details of which are discussed above.

In Step 504, the training agent embeds the natural language query and the query-specific schema to generate initialized embeddings. In one or more embodiments, the embedding is performed by an embedding agent (e.g., 312, FIG. 3), the details of which are discussed above.

In Step 506, the training agent generates, for each natural language query, a subgraph based on the initialized embeddings and the natural language query. In one or more embodiments, the subgraph is generated by a graph generator (e.g., 314, FIG. 3), the details of which are discussed above.

In Step 508, the training agent trains a GNN using the subgraph and also generates, using the GNN and the subgraph, a refined output. In one or more embodiments, training the GNN is performed by a GNN trainer (e.g., 316, FIG. 3), the details of which are discussed above.

In Step 510, the training agent trains a transformer model using the refined output from the GNN and the natural language query. In one or more embodiments, training the transformer model is performed by a transformer trainer (e.g., 318, FIG. 3), the details of which are discussed above. Further, in one or more embodiments, Steps 502-510 may be iterated for each pair of natural language queries and corresponding SQL statements.

In Step 512, the training agent refines the trained GNN and transformer model. In one or more embodiments, the refining is performed by an error generator (e.g., 320, FIG. 3), the details of which are discussed above.

In one or more embodiments, the method ends following Step 512.

As discussed above, embodiments of the disclosure may be implemented using computing devices. FIG. 6 shows a diagram of a computing device (600) in accordance with one or more embodiments. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. The communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (608, 610) may be locally or remotely connected to the computer processor(s) (602), non-persistent storage (604), and persistent storage (606). Many diverse types of computing devices exist, and the aforementioned input and output device(s) (608, 610) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for training and using a model to generate a structured query language (SQL) output using a natural language input, the method comprising:
training the model by:
receiving a training data set comprising natural language queries, corresponding SQL statements, and a corresponding database;
extracting query-specific schema from the corresponding database;
embedding the natural language queries and the query-specific schema to generate initialized embeddings, wherein each initialized embedding corresponds to a natural language query of the natural language queries, and wherein the corresponding SQL statement is one of the corresponding SQL statements;
generating subgraphs based on the initialized embeddings and the natural language queries;
generating, using a graph neural network (GNN), refined outputs based on the subgraphs, wherein the GNN is trained using the subgraphs as inputs; and
training a transformer model using the refined outputs and the natural language queries to obtain a trained model;
receiving a user input, wherein the user input comprises a user natural language query;
identifying a target database based on the user input;
generating a subgraph input based on the user input and a database schema associated with the target database;
generating, using the subgraph input and the user input as inputs to the trained model, a SQL query; and
performing, based on the user input and the SQL query, an action from an action set.

2. The method of claim 1, wherein the target database is the corresponding database.

3. The method of claim 1, wherein the action set comprises at least one of the following: presenting the SQL query to the user, executing the SQL query on the target database and presenting a results list to the user, and executing the SQL query on the target database and manipulating the database based on the user input.

4. The method of claim 1, wherein training the model further comprises:
refining, via backpropagation, the GNN and transformer model based on a loss function.

5. The method of claim 1, wherein the GNN is further trained utilizing a regularization technique and an over-smoothing technique.

6. The method of claim 1, wherein the embedding is based on pre-trained word embeddings, metadata associated with the corresponding database, and query context.

7. The method of claim 1, wherein the GNN is further trained by, for each subgraph of the subgraphs, dynamically adjusting a number of layers of the GNN based on a number of nodes for the each subgraph.

8. A method for training a model to generate a structured query language (SQL) output using a natural language input, the method comprising:
- receiving a training data set comprising natural language queries, corresponding SQL statements, and a corresponding database;
- extracting query-specific schema from the corresponding database;
- embedding the natural language queries and the query-specific schema to generate initialized embeddings, wherein each initialized embedding corresponds to a natural language query of the natural language queries, and wherein the corresponding SQL statement is one of the corresponding SQL statements;
- generating subgraphs based on the initialized embeddings and the natural language queries;
- training a graph neural network (GNN) using the subgraphs as inputs;
- generating, using the GNN, refined outputs based on the subgraphs; and
- training a transformer model using the refined outputs and the natural language queries to obtain a trained model.

9. The method of claim 8, wherein training the model further comprises:
- refining, via backpropagation, the GNN and transformer model based on a loss function.

10. The method of claim 8, wherein training the GNN further comprises:
- utilizing a regularization technique and an over-smoothing technique.

11. The method of claim 8, wherein the embedding is based on pre-trained word embeddings, metadata associated with the corresponding database, and query context.

12. The method of claim 8, wherein training the GNN further comprises:
- for each subgraph of the subgraphs, dynamically adjusting a number of layers of the GNN based on a number of nodes for the each subgraph.

13. A method for using a model to generate a structured query language (SQL) output using a natural language input, the method comprising:
- receiving a user input, wherein the user input comprises a user natural language query;
- identifying a target database based on the user input;
- generating a subgraph input based on the user input and a database schema associated with the target database;
- generating, using the subgraph input and the user input as inputs to the model, a SQL query; performing, based on the user input and the SQL query, an action from an action set;
- training the model by:
  - receiving a training data set comprising natural language queries, corresponding SQL statements, and a corresponding database;
  - extracting query-specific schema from the corresponding database;
  - embedding the natural language queries and the query-specific schema to generate initialized embeddings, wherein each initialized embedding corresponds to a natural language query of the natural language queries, and wherein the corresponding SQL statement is one of the corresponding SQL statements;
  - generating subgraphs based on the initialized embeddings and the natural language queries;
  - training a transformer model using the subgraphs and the natural language queries to obtain a trained model;
  - training a graph neural network (GNN) using the subgraphs as inputs, wherein the GNN is used to obtain the trained model; and
  - refining, via backpropagation, the GNN and transformer model based on a loss function.

14. The method of claim 13, wherein the action set comprises at least one of the following: presenting the SQL query to the user, executing the SQL query on the target database and presenting a results list to the user, executing the SQL query on the target database and manipulating the database based on the user input.

15. The method of claim 13, wherein the target database is the corresponding database.

16. The method of claim 13, wherein training the GNN further comprises utilizing a regularization technique and an over-smoothing technique.

17. The method of claim 13, wherein training the GNN further comprises, for each subgraph, dynamically adjusting a number of layers of the GNN based on a number of nodes for the each subgraph.

18. The method of claim 13, wherein the embedding is based on pre-trained word embeddings, metadata associated with the corresponding database, and query context.

* * * * *